United States Patent [19]

Shieh et al.

[11] Patent Number: 5,393,880
[45] Date of Patent: Feb. 28, 1995

[54] CYCLODEXTRIN REFINING PROCESS

[75] Inventors: Wen Shieh, Crown Point; Timothy Dailey, Portage; Allan Hedges, Crown Point, all of Ind.

[73] Assignee: American Maize-Products Company, Stamford, Conn.

[21] Appl. No.: 78,971

[22] Filed: Jun. 17, 1993

[51] Int. Cl.⁶ ............................................ C08B 37/16
[52] U.S. Cl. .................................... 536/103; 536/124; 536/127; 536/128
[58] Field of Search ............... 536/103, 124, 127, 128; 127/34, 46.2, 53, 58

[56] References Cited

U.S. PATENT DOCUMENTS

| | | | |
|---|---|---|---|
| 4,384,898 | 5/1983 | Okada et al. | 127/40 |
| 4,418,144 | 11/1983 | Okada et al. | 435/96 |
| 4,781,977 | 11/1988 | Yagi et al. | 428/332 |
| 4,808,232 | 2/1989 | Beesley | 127/46.3 |

Primary Examiner—John Kight, III
Assistant Examiner—Jeffrey Culpeper Mullis
Attorney, Agent, or Firm—Lucas & Just

[57] ABSTRACT

Cyclodextrin is refined by performing a crystallization step in the presence of a hydrogen bond inhibitor. The hydrogen bond inhibitor includes a base in an amount to adjust the pH of the solution to 8 and above or a non-base such as urea, guanidium hydrochloride and sodium lauryl sulfate in an amount of 0.1% to 2%.

17 Claims, No Drawings

CYCLODEXTRIN REFINING PROCESS

This invention relates to cyclodextrins and, more particularly, to a process for refining cyclodextrins to produce cyclodextrins which, when added to water, produce a solution which is substantially haze-free.

Cyclodextrins are oligomers of anhydroglucose which are in a ringed structure and are named according to the number of anhydroglucose units in the ring. The most common cyclodextrins are alpha, beta and gamma cyclodextrins which have 6, 7 and 8 anhydroglucose units in their ring structure, respectively. Because of their ringed structure, cyclodextrins are most noted for their ability to act as a host compound for other molecules (guest compounds). This host-guest relationship is especially important in the fields of medicine, agriculture, chemicals, foods and cosmetics.

Conventionally, cyclodextrins are formed by the action of an enzyme, cyclodextrin-glycosyl-transferase (CGTase), on a starch substrate, starch, or a starch hydrolysate having a dextrose equivalent (DE) less than 10. A raw digest is formed by the action of CGTase on the starch substrate. The raw digest contains not only cyclodextrins but also linear saccharides as well as the enzyme and other components. The non-cyclodextrin components are generally considered to be by-products. In order to separate the cyclodextrin from the raw digest, a complexant is often employed to complex with the cyclodextrin and to cause the cyclodextrin to precipitate. The precipitated cyclodextrin is then collected and an aqueous solution of complexant and cyclodextrin is heated to disrupt the complex and drive off the complexant, leaving the cyclodextrin in solution. In order to recover the cyclodextrin from solution, the heated solution is cooled to ambient condition which results in the cyclodextrin crystallizing from solution. The non-cyclodextrin materials are, for the most part, considered to be waste products which must be separated from the cyclodextrins.

It has been discovered that during the conventional crystallization process used to harvest cyclodextrins from solution, some of the non-cyclodextrin materials precipitate with the cyclodextrins, and these precipitated non-cyclodextrin materials are recovered along with the cyclodextrins after crystallization. It has also been discovered that these precipitated non-cyclodextrin materials cause the haze in the recovered crystallized cyclodextrins. Although in some applications, such as cloudy beverages and agricultural chemicals, haze has little or no effect, in other areas, such as foods and pharmaceuticals, clarity is important and haze has a deleterious effect on the marketability of the cyclodextrins.

It has been found that if filter paper is used to remove the non-cyclodextrin components from the cyclodextrins, then the filter paper is quickly blocked thereby preventing further filtration. Another solution for removing the non-cyclodextrin materials has been to use chromatographic techniques to separate the different solid components from each other, see for example, U.S. Pat. Nos. 4,384,898; 4,418,144; 4,781,977; and 4,808,232. A drawback to these chromatographic procedures is that they require an added step during the processing of the cyclodextrins. There is a need for a process for refining cyclodextrins which is simple and does not add substantially to the time or cost of manufacturing cyclodextrins.

A process for refining cyclodextrins which removes the non-cyclodextrin materials from the cyclodextrins after the cyclodextrins have been recovered from the raw digest has now been discovered. The process of the present invention is simple and does not add substantially to the time and cost of processing cyclodextrins. The process of the present invention is employed either during the conventional processing of the cyclodextrins or as an added step to a crude cyclodextrin product.

It has now been discovered that if a hydrogen bond inhibitor is employed during the crystallization process, the non-cyclodextrin materials do not precipitate with the cyclodextrins. It is both surprising and unexpected that the hydrogen bond inhibitor allows for crystallization of the cyclodextrin while inhibiting the precipitation of the non-cyclodextrin materials.

Although the invention is not completely understood, it is thought that the major component in the non-cyclodextrin materials is linear saccharides having a degree of polymerization of about 20 to about 40 and that there is hydrogen bonding between the linear saccharides themselves, rather than between the cyclodextrin and the linear saccharides, which causes the linear saccharides to precipitate during crystallization. It is further hypothesized that retrogradation of these linear saccharides forms a haze when the cyclodextrin is in solution.

Broadly, the process of the present invention comprises the steps of crystallizing cyclodextrins from an aqueous solution containing cyclodextrins in the presence of an effective amount of a hydrogen bond inhibitor, the amount of hydrogen bond inhibitor being effective to prohibit the precipitation of the non-cyclodextrin materials during crystallization of the cyclodextrins and the amount of hydrogen bond inhibitor being effective to allow the cyclodextrin to be precipitated, crystallized, and substantially free of non-cyclodextrin materials. The substantially pure cyclodextrins are then recovered from the solution.

Hydrogen bond inhibitors include both bases and non-bases. Suitable non-bases include urea, guanidium hydrochloride and sodium lauryl sulfate. Suitable bases include sodium hydroxide, potassium hydroxide and ammonium hydroxide. Good results have been obtained using hydrogen bond inhibitors that are bases.

The amount of hydrogen bond inhibitor added to the solution is an amount sufficient to block the precipitation of the non-cyclodextrin materials without inhibiting the crystallization of the cyclodextrin. The amount of base necessary to inhibit the formation of the non-cyclodextrin materials is conveniently measured by measuring the pH of the solution after the base has been mixed into the solution. When using a base, the pH is preferably about 8 and above and, more preferably, the pH of the solution is about 8 to about 13. A pH of about 9 to about 12 is most preferred, with good results being obtained with a pH of about 10 to about 12. The pH is conventionally measured with a pH meter or any other method which is well-known to those of skill in the art.

The amount of non-base used to inhibit the precipitation of the non-cyclodextrin materials is preferably present in the solution in an amount of about 0.1% to about 5%. More preferably, the amount of non-base hydrogen bond inhibitor is about 0.5% to about 3%. The amount of non-base used in the solution is most preferably about 1% to about 2%. These amounts are based on weight percent of solution.

In accordance with the present invention, the hydrogen bond inhibitor is present in the solution during a crystallization process. For best results, the hydrogen bond inhibitor is added and uniformly mixed into the solution prior to the start of the crystallization process; however, the hydrogen bond inhibitor may be added and mixed into solution simultaneously with the start of the crystallization process or after the crystallization process has started. In order to obtain the cyclodextrin with the least amount of non-cyclodextrin materials, the hydrogen bond inhibitor is added and uniformly mixed into solution prior to the start of the crystallization step. Adding and mixing the hydrogen bond inhibitor into the solution is done in a conventional manner using conventional equipment. The step of adding and mixing the hydrogen bond inhibitor in solution takes only a few minutes. As soon as the hydrogen bond inhibitor is uniformly mixed into solution, crystallization is, preferably, started.

The process of crystallization of cyclodextrins from solution is conventional and is generally accomplished over the period of about one day by cooling the solution from a temperature of about 100° C. down to room temperature, i.e. about 20° C., at atmospheric pressure. Throughout the cooling process, the cyclodextrins crystallize (precipitate) out of solution. Naturally, the length of time for cooling depends on the size of the vessel employed for crystallization. Conventionally, the cyclodextrins are crystallized from an aqueous solution having a solids content of about 10% to about 40%. The present invention has been found to work well when the solids content of the aqueous solution is about 20% to about 30% by weight. The solution is water based and substantially free of other solvents.

The solids of such aqueous solutions are generally made up of at least about 50% by weight cyclodextrin, the other 50% being non-cyclodextrin materials, primarily believed to be linear saccharides. The present invention operates best with a solution wherein the cyclodextrin makes up as much as possible of the solids and preferably at least about 75% by weight of the solids; more preferably, the cyclodextrin makes up at least about 85% by weight of the solids.

The aqueous solution containing the unrefined cyclodextrins which is subjected to the process of the present invention is preferably one which has already been subjected to a complexation process wherein the cyclodextrin had been precipitated using a complexant from a raw digest. Alternatively, any solution which contains unrefined cyclodextrins or produces haze upon standing and from which cyclodextrins can be crystallized can be subjected to the process of the present invention. The present invention can be carried out in either a batch operation or in a continuous process.

Conventionally, cyclodextrins are made by reacting a starch or starch hydrolysate, DE 10 and below, with a CGTase to form a raw digest. From this raw digest cyclodextrins are precipitated by means of a complexant. The complexant forms a complex with the cyclodextrin and the complex precipitates out of solution. The precipitated complex is recovered from the raw digest and subjected to a steam distillation or other conventional step to separate the complexant from the cyclodextrin. The separated cyclodextrin is in an aqueous solution which is then either further processed or dried and sold as product. In accordance with the present invention, the cyclodextrin separated from the raw digest is preferably subjected to a conventional carbon treatment prior to the crystallization step of the present invention.

Carbon treatment is typically accomplished using activated carbon to remove color, color precursors, and undesirable off-flavored materials. Carbon treatment removes most of the soluble proteinaceous material present. Additionally, activated carbon is effective in the removal of heavy metals, such as iron and copper. Conventionally, carbon treatment is a 2- or 3-stage countercurrent batch application of activated powdered carbon or a countercurrent application of activated granular carbon in cylindrical columns. Such operation is accomplished in a conventional manner.

In accordance with a preferred embodiment of the present invention, the cyclodextrin, after carbon treatment, is subjected to a crystallization process in the presence of an effective amount of hydrogen bond inhibitor. The temperature and timing sequence of the crystallization process is conducted in a conventional manner. Preferably, the aqueous solution of unrefined, carbon treated cyclodextrin starts at a temperature of about 110° C. to about 90° C. and is cooled to a temperature of about 20° C. to about 50° C. This cooling step preferably takes place over a period of about one day. Each manufacturer of cyclodextrin has its own cooling sequence and, depending on the size of the vessel, the time will vary. The process of the present invention is preferably employed during the cooling sequence of the crystallization process. Cooling normally takes place at atmospheric pressure. The crystallization process of the present invention can be performed only once, or it can be performed a plurality of times.

The crystallization process of the present invention can also be used on any cyclodextrin which, when added to water, produces haze wherein the haze is due in whole or in part to linear saccharides. Thus, a drug manufacturer who has purchased cyclodextrins which produce a haze upon being added to water, can employ the present invention to remove the haze and refine the cyclodextrins.

The crystallized cyclodextrins which have been subjected to the process of the present invention are recovered from the solution in a conventional manner such as by centrifugation or filtration, using conventional equipment. The recovered cyclodextrins are then dried or further processed. Good results have been obtained by drying.

The aqueous solution of unrefined cyclodextrin can contain one type of cyclodextrin, for example, beta cyclodextrin, or it can contain different cyclodextrins, for example, a mixture of alpha, beta and gamma cyclodextrins. Good results have been obtained with solutions containing only unrefined beta cyclodextrin.

Good results have been obtained in accordance with the present invention by adjusting the pH of aqueous solution to within the desired range and then allowing the cooling sequence and crystallization to take place. During cooling the pH is monitored to insure that it stays within the range of the present invention. Likewise, the concentration of the non-base hydrogen bond inhibitors is monitored so that it is maintained within the range taught by the present invention. Preferably, the pH of the aqueous solution is maintained throughout the crystallization step.

These and other aspects of the present invention may be more fully understood by reference to the following examples.

EXAMPLE 1

This example illustrates employing the process of the present invention in a conventional production process wherein predominantly beta cyclodextrin was produced.

A 30% by weight slurry of starch hydrolysate (5-8 DE) was prepared. The slurry was heated and maintained at optimum temperature for the CGTase, and the CGTase was added along with 5% of a complexant to produce cyclodextrins from the raw digest.

After the reaction was completed, the complex of cyclodextrin and complexant was harvested by conventional means. The collected complex was diluted and heated to 100° C. and maintained at that temperature to break the complex and cause separation of the cyclodextrin from the complexant. The complexant being more volatile than the cyclodextrin, the complexant was carried off with the steam.

Next, the cyclodextrin and water solution was subjected to a carbon treatment in a conventional manner. This carbon treated solution was then divided into three samples, two of which were subjected to the process of the present invention and the third crystallized in a conventional manner.

In accordance with the present invention, sodium hydroxide was added to two of the solutions and mixed into the solutions to adjust the pH of the solutions to 10 and 12, respectively. Then the pH adjusted solutions and the non-pH adjusted solution were cooled from about 90° C. to room temperature (20° to 25° C.). During this cooling step, crystals of cyclodextrin formed. The crystals from each solution were then collected by filtration and dried to about 13% moisture.

The table below lists the results of spectrophotometric readings taken of an aqueous solution made up from the cyclodextrin recovered after crystallization, as described above.

TABLE 1

|  | % T |
|---|---|
| Control (no pH adjustment) | 74.5 |
| A (pH 10.5) | 99.8 |
| B (pH 11.5) | 99.6 |

Each solution was prepared by making up a 15% by weight solution of the dried cyclodextrin crystals. In order to make these concentrated solutions of beta cyclodextrin, the solutions were heated. The solutions were then allowed to cool to ambient temperature (20° to 25° C.) and the transmittance (%T) was then measured through a 1 cm cell at 660 nm with a spectrophotometer. As will be appreciated by those of skill in the art, some of the beta cyclodextrin crystallized out of solution upon cooling to room temperature and the transmittance was measured on the solution itself (filtrate).

EXAMPLE 2

This example illustrates refining a dried product which was obtained from a manufacturing process directed to producing predominantly gamma cyclodextrin.

The dried product was divided in half and added to water to form an aqueous solution. One half was subjected to crystallization in accordance with the present invention while the other half was crystallized in a conventional manner.

In accordance with the present invention, a 2N solution of sodium hydroxide was added to one half of the solution and mixed into the solution to adjust the pH of the solution to between 10 and 12.

Then both the pH adjusted solution and the non-pH adjusted solution were cooled from about 90° C. to room temperature. During this cooling step, crystals of cyclodextrin formed. The crystals from each solution were then collected by filtration and dried to 12% moisture.

Three solutions, each at 15% solids by weight, were made up. One solution contained the dried product prior to refinement in accordance with the present invention, a second solution contained cyclodextrin which had been refined in accordance with the present invention, and a third solution contained cyclodextrin which had been subjected to a crystallization step without the addition of a hydrogen bond inhibitor in accordance with the present invention.

Table 2 below lists the results of spectrophotometric readings taken of an aqueous solution containing the cyclodextrin before crystallization and after crystallization.

TABLE 2

|  | % T |
|---|---|
| Before Crystallization | 81.9 |
| After Crystallization, Present Invention | 98.2 |
| After Crystallization, Conventional | 93.5 |

These solutions were measured in accordance with Example 1 above. Since gamma cyclodextrin is more soluble than beta cyclodextrin, no gamma cyclodextrin crystals were formed during cooling.

EXAMPLE 3

This example repeats Example 2 except that a non-base hydrogen bond inhibitor is used.

In two solutions of gamma cyclodextrin, 1% and 2% by weight solution of urea was added and the cyclodextrin crystallized out. In a third solution, no urea was added, but the gamma cyclodextrin was crystallized.

The three crystallized gamma cyclodextrin products were recovered and three solutions of 15% by weight gamma cyclodextrin were prepared according to Example 2 and were measured spectrophotometrically. The results are set forth below:

TABLE 3

|  | % T |
|---|---|
| After Crystallization, Conventional | 91.2 |
| After Crystallization, 1% Urea | 92.9 |
| After Crystallization, 2% Urea | 98.3 |

It will be understood that the claims are intended to cover all changes and modifications of the preferred embodiments of the invention heein chosen for the purpose of illustration which do not constitute a departure from the spirit and scope of the invention.

What is claimed is:

1. A process for refining cyclodextrin comprising the steps of:
  (a) crystallizing a cyclodextrin from an aqueous solution containing unrefined cyclodextrin and having a solids concentration of about 10 to about 40% by weight, said unrefined cyclodextrin obtained from a raw digest which resulted from a treatment of a starch or starch hydrolysate having a DE of 10 and below with a CGTase, said unrefined cyclodextrin comprising at least about 50% by weight cyclodextrin and a remainder of non-cyclodextrin materials, said non-cyclodextrin materials being primarily linear saccharides, in the presence of an effective amount of a hydrogen bond inhibitor, the amount of hydrogen bond inhibitor being effective to prohibit precipitation of the non-cyclodextrin materials during crystallization of the cyclodextrin; and (b) recovering the crystallized cyclodextrin which, when added to water, provides a substantially haze free solution.

2. The process of claim 1 wherein the hydrogen bond inhibitor is a base and the amount of base added is effective to raise the pH of the aqueous solution to about 8 and above.

3. The process of claim 1 wherein the hydrogen bond inhibitor is a non-base selected from the group consisting of urea, guanidium hydrochloride and sodium lauryl sulfate (dodecyl sodium sulfate); and the hydrogen bond inhibitor is added to said solution in an amount of about 0.1% to about 2% by weight.

4. The process of claim 2 wherein the base is selected from the group consisting of sodium hydroxide, potassium hydroxide and ammonium hydroxide.

5. The process of claim 1 wherein the aqueous solution has a solids concentration of about 20 to about 30% by weight and the cyclodextrin accounts for at least about 75% by weight of said solids in solution.

6. The process of claim 2 further comprising the step of maintaining the pH of said solution throughout the crystallization step.

7. The process of claim 1 wherein the step of recovering the crystallized cyclodextrin is accomplished by filtration or centrifugation.

8. The process of claim 1 wherein the crystallization step is accomplished by slowly cooling the solution from about 100° C. to about 20° C. over a period of about 24 hours at atmospheric pressure.

9. The process of claim 1 wherein said cyclodextrin in the aqueous solution is beta cyclodextrin.

10. A process for refining cyclodextrin comprising the steps of:

(a) crystallizing cyclodextrin from an aqueous solution containing unrefined cyclodextrin and having a solids concentration of about 10 to about 40% by weight, said unrefined cyclodextrin obtained from a raw digest which resulted from a treatment of a starch or starch hydrolysate having a DE of 10 and below with a CGTase, said unrefined cyclodextrin comprising at least about 50% by weight cyclodextrin and a remainder of non-cyclodextrin materials, said non-cyclodextrin materials being primarily linear saccharides, wherein the solution has a pH of about 8 and above; and (b) recovering the crystallized cyclodextrin which, when added to water, provides a substantially haze free solution.

11. The process of claim 10 wherein the pH of the solution is between about 9 and about 11.

12. The process of claim 10 wherein a base is mixed into the solution and the base is selected from the group consisting of sodium hydroxide, potassium hydroxide and ammonium hydroxide.

13. The process of claim 10 wherein the aqueous solution has a solids concentration of about 20% to about 30% and the cyclodextrin accounts for at least about 75% by weight of said solids in solution.

14. The process of claim 10 wherein the crystallization step is accomplished by slowly cooling the solution from about 100° C. to about 20° C. over a period of about 24 hours at atmospheric pressure.

15. The process of claim 10 further comprising the step of adjusting the pH of the solution prior to crystallization by adding a base to the solution.

16. The process of claim 10 further comprising the step of maintaining the pH of the solution at above about 8 throughout the crystallization step.

17. A process for refining cyclodextrin comprising the steps of:

(a) adding a sufficient amount of a base to an aqueous solution containing unrefined cyclodextrin and having a solids concentration of about 10 to about 40% by weight, said unrefined cyclodextrin obtained from a raw digest which resulted from a treatment of a starch or starch hydrolysate having a DE of 10 and below with a CGTase, said unrefined cyclodextrin comprising at least about 50% by weight cyclodextrin and a remainder of non-cyclodextrin materials, said non-cyclodextrin materials being primarily linear saccharides, so that the solution has a pH of about 9 to about 12;

(b) cooling said solution such that crystals of the cyclodextrin start to form; and (c) recovering the crystallized cyclodextrin which when added to water, provides a substantially haze free solution.

* * * * *